United States Patent [19]
Hasegawa

[11] Patent Number: 5,477,340
[45] Date of Patent: Dec. 19, 1995

[54] FACSIMILE TERMINAL EQUIPMENT HAVING COMMUNICATION SPEED SWITCH

[75] Inventor: Kenichi Hasegawa, Inagi, Japan

[73] Assignee: Fujitsu Limited, Kawasaki, Japan

[21] Appl. No.: 713,162

[22] Filed: Jun. 11, 1991

[30] Foreign Application Priority Data

Jun. 11, 1990 [JP] Japan .................................. 2-152353
Sep. 26, 1990 [JP] Japan .................................. 2-256291

[51] Int. Cl.$^6$ ........................................... H04N 1/32
[52] U.S. Cl. ...................... 358/438; 358/412; 358/434; 358/468
[58] Field of Search .................... 358/434, 435, 358/409, 412, 442, 438, 436, 468, 406; 375/8; 379/200

[56] References Cited

U.S. PATENT DOCUMENTS

| | | | |
|---|---|---|---|
| 3,831,091 | 8/1974 | Kanitz et al. ............................. | 358/435 |
| 4,538,286 | 8/1985 | McNesby et al. ....................... | 375/363 |
| 4,583,124 | 4/1986 | Tsuji ........................................ | 358/412 |
| 4,630,126 | 12/1986 | Kakau et al. ............................ | 358/412 |
| 4,894,847 | 1/1990 | Tjahjadi et al. ............................. | 375/8 |
| 4,910,610 | 3/1990 | Utsugi ..................................... | 358/434 |
| 4,922,348 | 5/1990 | Gillon et al. ............................. | 358/434 |
| 4,999,716 | 3/1991 | Nakamura ............................... | 358/434 |
| 5,050,005 | 9/1991 | Kagami .................................... | 358/434 |
| 5,105,423 | 4/1992 | Tanaka et al. ........................... | 358/412 |
| 5,142,525 | 8/1992 | Nakatsuma .............................. | 379/209 |

FOREIGN PATENT DOCUMENTS

2589657  5/1987  France .

OTHER PUBLICATIONS

Patent Abstracts Of Japan, vol. 7, No. 119 (E–177) 24 May 1983 & JP–A–58 039 167 (Nippon Denki K.K.), Mar. 1983, "Transmission Speed Converting System for Facsimile", Oouchi Nobuaki et al. * abstract*.
Patent Abstracts Of Japan, vol. 10, No. 184 (E–415) 27 Jun. 1986 & JP–A–61 030 871 (Fujitsu Ltd.) 13 Feb. 1986, "Facsimile Receiver", Yoshikawa Masaya, *abstract*.
Patent Abstracts Of Japan, vol. 6, No. 91 (E–109) 28 May 1982, "Converting System of Transmitting Speed", Nagashima Yoshio et al., *abstract*.

*Primary Examiner*—Scott A. Rogers
*Assistant Examiner*—Fan Lee
*Attorney, Agent, or Firm*—Staas & Halsey

[57] ABSTRACT

A facsimile terminal communicates facsimile data with an opposite facsimile terminal through an ISDN circuit. Even if the communication speed of the facsimile terminal is different from that of the opposite terminal, the facsimile terminal can surely exchange the facsimile data with the opposite terminal. The facsimile terminal includes a transmission and reception unit for transmitting and receiving data to and from the opposite terminal through the ISDN circuit, a receiving condition judging unit for judging or determining whether or not the transmission and reception unit receives data normally. The facsimile terminal also includes a speed switching instruction unit for providing a speed switching instruction when the transmission and reception unit does not normally or successfully receive data. In addition a speed switching control unit is provided for switching the communication speed of the transmission and reception unit from one speed to another according to the speed switching instruction.

14 Claims, 16 Drawing Sheets

Fig. 12

| b8 | b7 | b6 | b5 | b4 | b3 | b2 | b1 |
|----|----|----|----|----|----|----|----|
| A8 | A7 | A6 | A5 | A4 | A3 | A2 | A1 |
| B8 | B7 | B6 | B5 | B4 | B3 | B2 | B1 |
| C8 | C7 | C6 | C5 | C4 | C3 | C2 | C1 |
| D8 | D7 | D6 | D5 | D4 | D3 | D2 | D1 |
| E8 | E7 | E6 | E5 | E4 | E3 | E2 | E1 |
| F8 | F7 | F6 | F5 | F4 | F3 | F2 | F1 |

BUFFER DATA WHEN DATA ARE RECEIVED AT A SPEED OF 64 kbps

Fig. 14

| b8 | b7 | b6 | b5 | b4 | b3 | b2 | b1 |
|----|----|----|----|----|----|----|----|
| B1 | A7 | A6 | A5 | A4 | A3 | A2 | A1 |
| C2 | C1 | B7 | B6 | B5 | B4 | B3 | B2 |
| D3 | D2 | D1 | C7 | C6 | C5 | C4 | C3 |
| E4 | E3 | E2 | E1 | D7 | D6 | D5 | D4 |
| F5 | F4 | F3 | F2 | F1 | E7 | E6 | E5 |
| · · · · · · · · · · · · | | | | | | F7 | F6 |

BUFFER DATA WHEN DATA ARE RECEIVED AT A SPEED OF 56 kbps

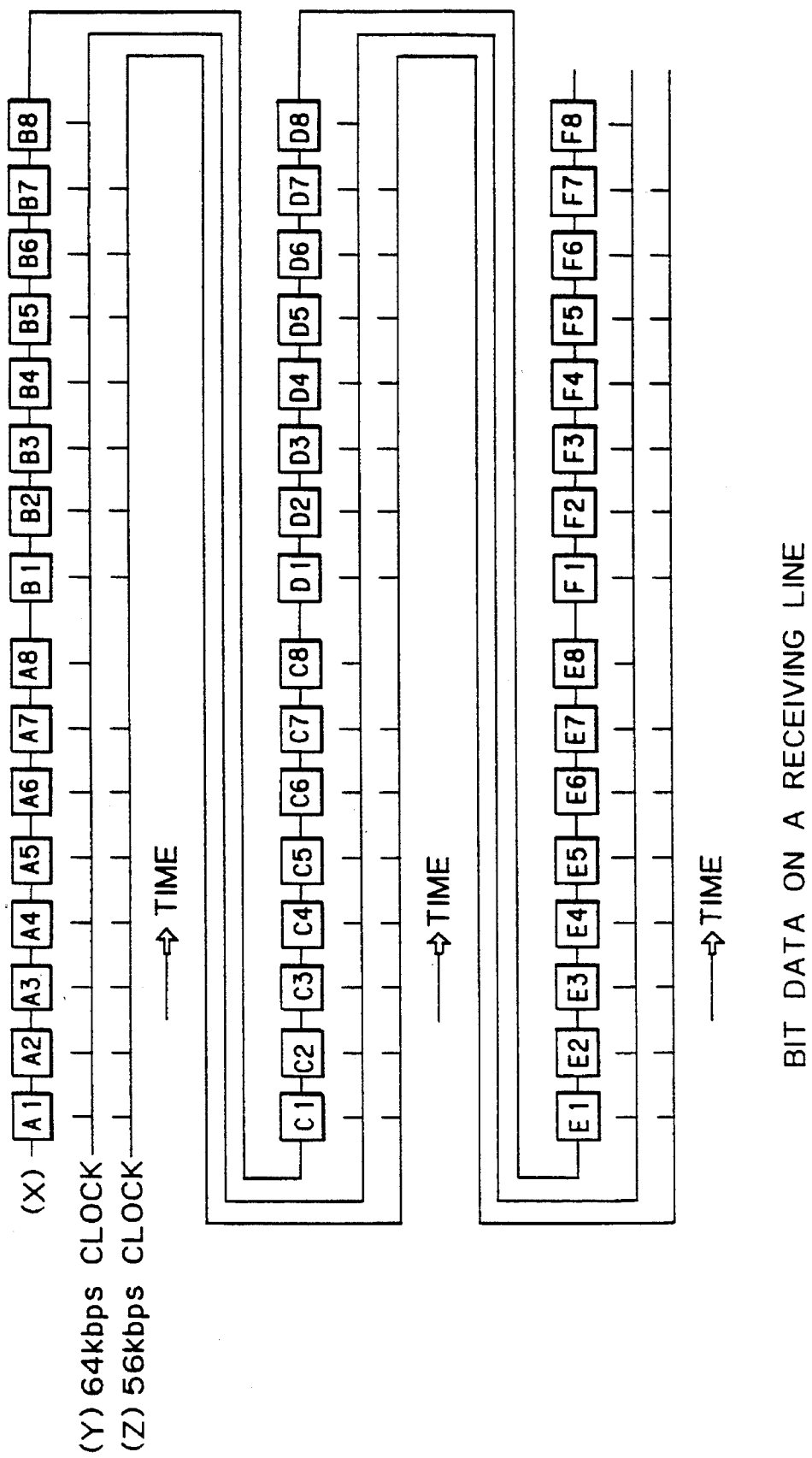

Fig. 15

| b8 | b7 | b6 | b5 | b4 | b3 | b2 | b1 |
|----|----|----|----|----|----|----|----|
| S8 | S7 | S6 | S5 | S4 | S3 | S2 | S1 |
| T8 | T7 | T6 | T5 | T4 | T3 | T2 | T1 |
| U8 | U7 | U6 | U5 | U4 | U3 | U2 | U1 |
| V8 | V7 | V6 | V5 | V4 | V3 | V2 | V1 |
| W8 | W7 | W6 | W5 | W4 | W3 | W2 | W1 |
| X8 | X7 | X6 | X5 | X4 | X3 | X2 | X1 |

BUFFER DATA FOR TRANSMISSION

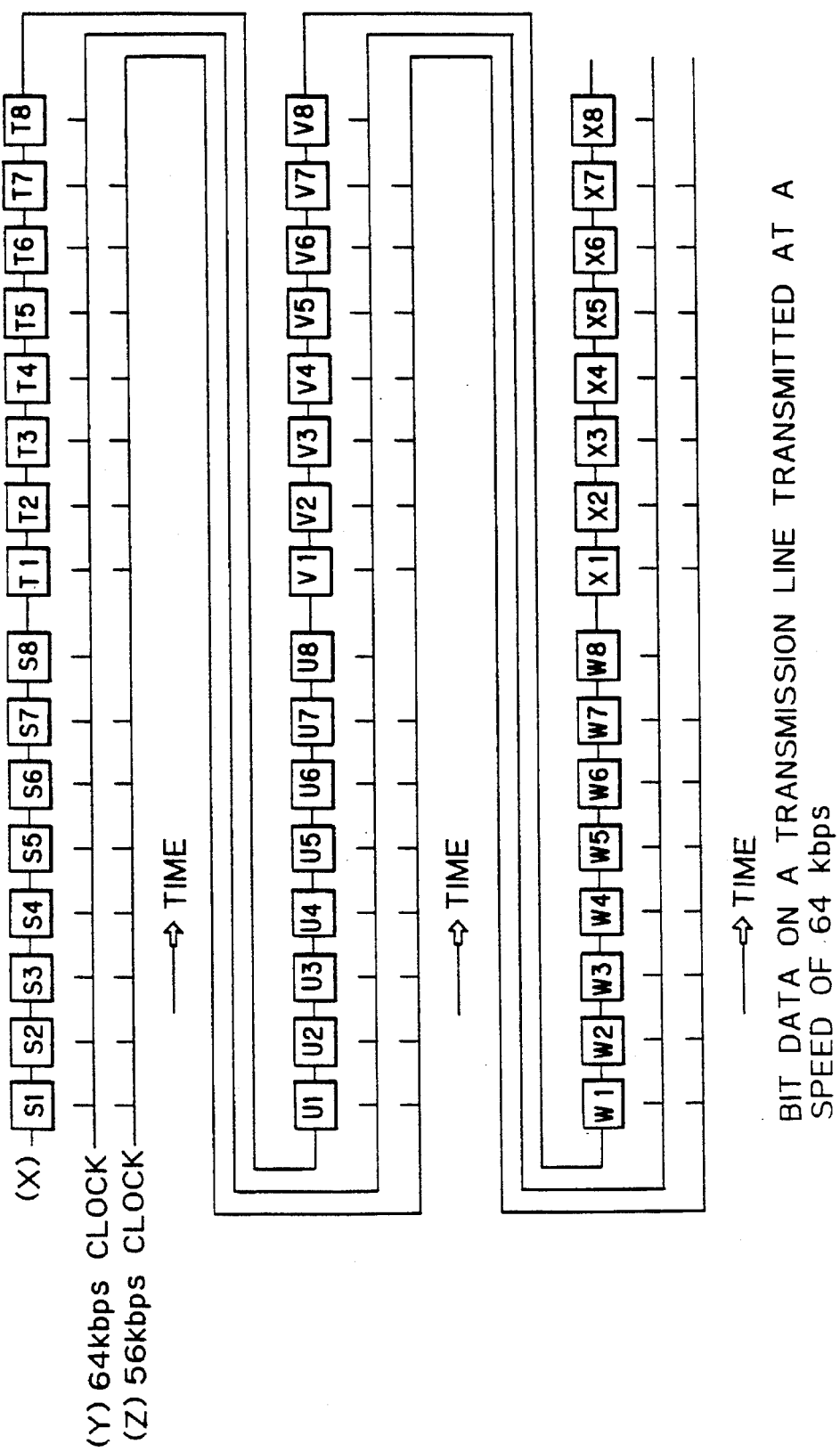

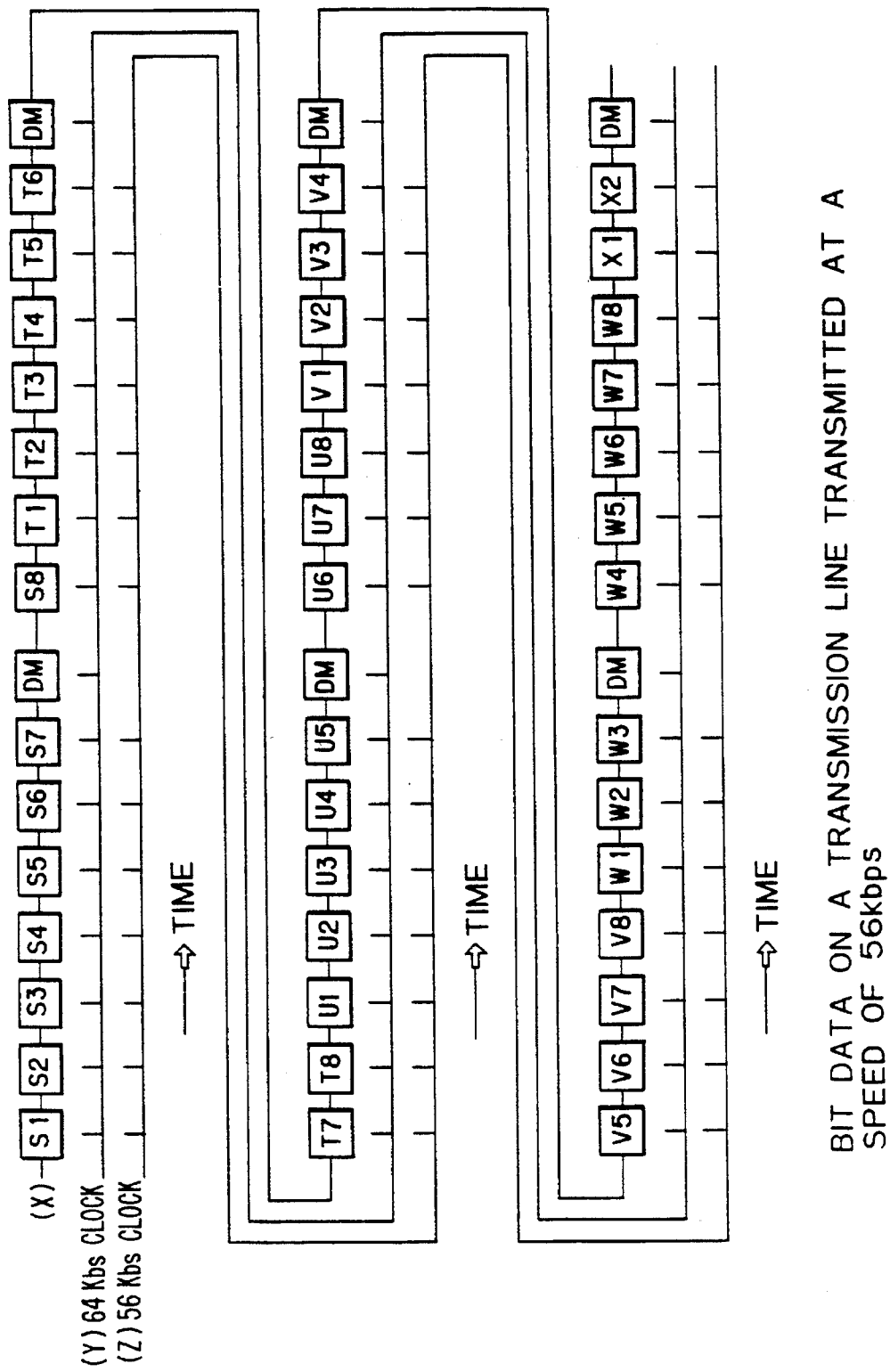

5,477,340

FACSIMILE TERMINAL EQUIPMENT HAVING COMMUNICATION SPEED SWITCH

BACKGROUND OF THE INVENTION

1. Field of the Invention

The present invention relates to facsimile terminal equipment units and particularly, to facsimile terminal equipment units for carrying out a facsimile communication through an ISDN (Integrated Service Digital Network).

2. Description of the Related Art

When facsimile communication is carried out in a circuit switching mode, which may operate using one of several communication speeds unless the same communication speed is established between communication terminals, such a communication is not possible.

Facsimile terminal equipment units that supports a so-called G4 facsimile communication standard have two communication modes, i.e., the circuit switching mode and a packet switching mode. Communication in the circuit switching mode is carried out through, for example, an ISDN circuit or an INS (a kind of ISDN) circuit.

There are typically two communication channels for transmitting signals in the circuit switching mode: the D-channel and the B-channel. Both channels are used when transmitting facsimile data. The D-channel is used for setting up the communication, and the B-channel is used for the transfer of data.

The communication speed of the D-channel of the ISDN circuit, which is standardized throughout the world is 16 Kilo bits per second (Kbps). The communication speed of the B-channel of the ISDN circuit, however, is not standardized, it is 64 Kbps in Japan and Europe, and 56 Kbps in North America.

To maintain communication between G4 facsimile terminals in Japan in the circuit switching mode, it is not necessary to adjust communication speed, whereas between Japan and North America, speed be adjusted due to the use of different communication speeds on the B-channel.

The speed adjustment is performed manually solely through an operator because it is impossible to know the communication speed of an opposing terminal. Namely, an originating facsimile terminal cannot identify the communication speed of the opposite facsimile terminal. To call the U.S. from Japan, for example, the operator enters the number of a facsimile terminal to be called in the U.S. as well as the U.S. communication speed of 56 Kbps. Thereafter, the communication speed is negotiated in a setting up controlling process for the D-channel.

According to this conventional technique, communication between Japan and North America, for example, is performed effectively if the operator enters the correct communication speed. To establish the correct communication speed, the operator must confirm the country of the opposite terminal and the communication speed of the country. This is troublesome for the operator. Since it is impossible to know the communication speed of the opposite terminal from the phone number of the facsimile terminal which the operator is calling it is possible that the operator will enter an incorrect communication speed in calling the opposite terminal.

As an example of such erroneous calling, FIG. 11 shows an originating or transmitting terminal having a communication speed of 64 Kbps calling an opposite or receiving terminal of 56 Kbps. In this example, the originating terminal is not provided with the information that the communication speed of the opposite terminal is 56 Kbps and therefore, has used an incorrect communication speed.

The actual process the two facsimile terminals perform when the incorrect communication speed is used is as follows: Since communication speed on the D-channel of ISDN is identical for every terminal connected to the ISDN, a setting up process (Steps i and ii) is done on the D-channel, and the opposite terminal returns acknowledgement signal (Step iii). As a result, the originating and received terminals then initially are then initially connected to each other through the B-channel of the ISDN (Step iv), and the originating terminal tentatively transmits a flag pattern at 64 Kbps on the B-channel (Step v-1). The opposite terminal cannot identify the flag pattern because of the difference in communication speed, and therefore, sends no acknowledging flag pattern. The originating terminal repeatedly transmits the flag pattern for a predetermined time period (for example, 20 to 60 seconds or more) (Steps v-1 through v-n). The originating terminal, since no reply is received, disconnects the B-channel without communicating facsimile data (Steps viii through xiii).

A similar matter may occur if data for negotiating communication speed is abandoned in the middle of relaying the data on the B-channel through many switching systems, or if a circuit failure occurs. The switching systems will also be unable to identify the appropriate communication speed to reestablish communication.

An additional problem is that the time period during which the B-channel is connected, i.e., a time period during which a circuit path exists on the B-channel is subjected to accounting. Even if facsimile communication is not carried out after repetitive test transmissions, a fee for using the ISDN will be charged.

SUMMARY OF THE INVENTION

An object of the invention is to provide facsimile terminal equipment unit that can surely carry out facsimile communication even if the opposite terminal equipment unit works at different communication speeds.

In order to accomplish the object, the invention provides facsimile terminal equipment units which communicates data with at least one opposite facsimile terminal equipment unit through a communication circuit such as an ISDN circuit. The facsimile terminal equipment basically comprises transmission and reception means for transmitting and receiving data to and from the opposite terminal equipment and a receiving condition judging means for judging whether or not the transmission and reception means receives data normally. In addition, the invention comprises speed switching instruction means for providing communication speed switching instructions when the transmission and reception means does not normally receive data; and speed switching control means for switching the data communication speed of the transmission and reception means from one to another according to the instruction.

FIG. 1 shows the principle and basic arrangement of the facsimile terminal equipment of the invention. In the figure, numeral 10 denotes an ISDN circuit, 12 the transmission and reception means, 14 the receiving condition judging means, 16 the speed switching instruction means, and 18 the speed switching control means.

The transmission and reception means 12 communicates data through the ISDN circuit 10. The receiving condition judging means 14 judges or determines whether or not the transmission and reception means 12 communicates data normally or successfully.

When the receiving condition judging means 14 judges or determines that the transmission and reception means 12 is not receiving data normally, the speed switching instruction means 16 provides the speed switching control means 18 with a communication speed switching instruction. According to the instruction, the speed switching control means 18 switches the data communication speed of the transmission and reception means 12 from the current improper communication speed to the appropriate communication speed.

BRIEF DESCRIPTION OF THE DRAWINGS

FIG. 12 is a diagram showing bits of data being stored in buffers when the data is received at a speed of 64 Kbps;

FIG. 13 is a diagram showing bit data being received by a facsimile terminal;

FIG. 14 is a diagram showing bits of data being stored in buffers when the data is received at a speed of 56 Kbps;

FIG. 15 is a diagram showing bits of data being stored in buffers when the data is transmitted at a speed of 64 Kbps;

FIG. 16 is a diagram showing bit data being transmitted by a facsimile terminal; and FIG. 17 is a diagram showing bit data including a dummy bit being transmitted by a facsimile terminal.

DESCRIPTION OF THE PREFERRED EMBODIMENTS

An embodiment of the invention will be explained in detail with reference to the drawings.

Figure 1:
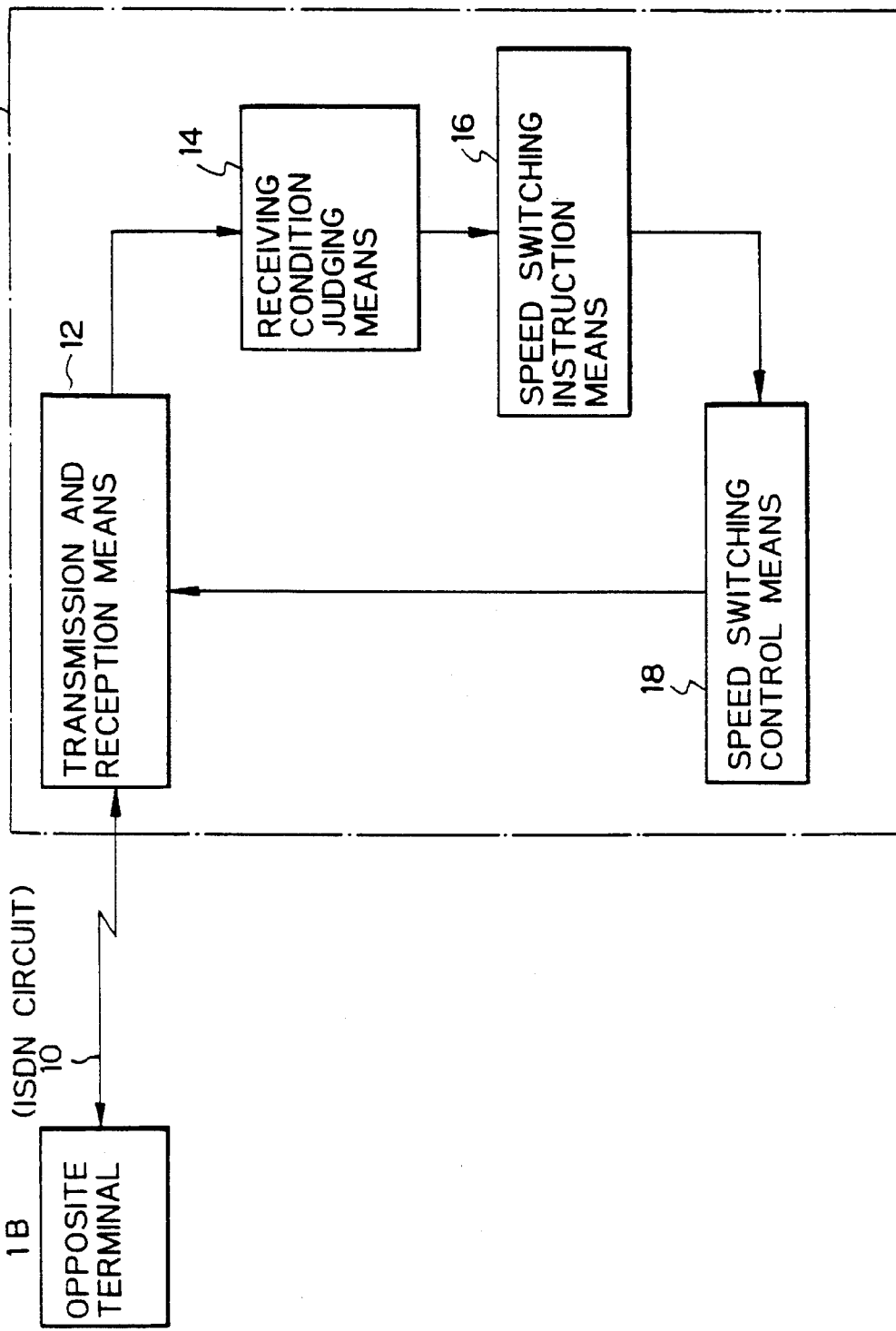
FIG. 1 is a block diagram showing a principle of the invention.
Figure 2:
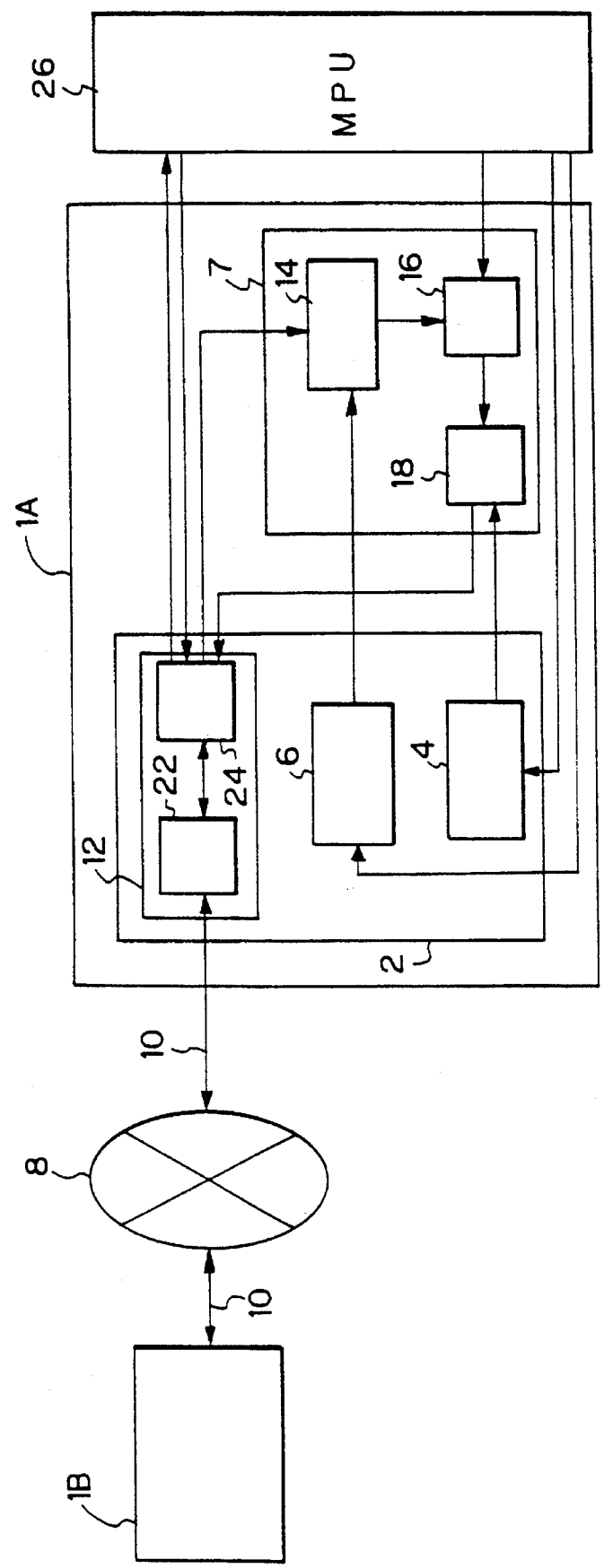
FIG. 2 is a block diagram showing facsimile terminal equipment according to an embodiment of the invention.

FIG. 2 shows a G4 facsimile terminals according to the embodiment of the invention. In the figure, numerals 1A and 1B denote facsimile terminals, 2 a communication processing portion, 4 a repeat counter, 6 a timer, 7 a communication speed setting portion, and 8 a network such as the ISDN and INS.

The facsimile terminal 1A is connected to the ISDN network 8 through an ISDN circuit 10. The facsimile terminal 1A has the communication processing portion 2 and communication speed setting portion 7. The communication processing portion 2 transmits and receives data at a speed of 64 Kbps basically. The communication speed setting portion 7 sets or switches the communication speed of the communication processing portion 2 from first and second communication speeds, for example 64 Kbps and 56 Kbps, according to the required data communication condition or speed.

The facsimile terminal 1B is similarly connected to the ISDN network 8 through the ISDN circuit 10 to communicate data with the facsimile terminal 1A. The communication speed of the facsimile terminal 1B is, for example 64 Kbps in Japan and 56 Kbps in North America.

The communication processing portion 2 of the facsimile terminal 1A has transmission and reception means 12, the timer 6, and repeat counter 4 to transmit and receive data on the D- and B-channels of the ISDN network 8.

When the facsimile terminal 1A serves as an originating terminal, the transmission and reception means 12 transmits a predetermined flag pattern. Thereafter, the communication processing portion 2 or the transmission and reception means 12 sets a predetermined value (T seconds) in the timer 6, and informs receiving condition judging means 14 of the transmission of the flag pattern.

When the facsimile terminal 1A serves as a receiving facsimile, the transmission and reception means 12 sends an acknowledgment signal. Thereafter, the communication processing portion 2 or the transmission and reception means 12 sets the timer 6, and informs the receiving condition judging means 14 of the sending of the acknowledgment signal.

The value set in the timer 6 defines a period for continuously transmitting a predetermined signal such as the flag pattern signal and is usually three to five seconds. The value of the timer 6 may be entered by an operator from the outside of the facsimile terminal 1A. The value of the timer 6 may be used to define a time period for judging or determining the receiving condition, i.e., the time to switch to another communication speed To communicate data according to the invention between at least two facsimile terminals such as the terminals 1A and 1B, an originating terminal sends predetermined flag information such as a reception number to the other opposite terminal. Upon confirmation of the flag information, the ISDN network connects the terminals to each other.

Thereafter, according to the invention, the originating terminal checks to see whether the communication speed thereof is the same as that of the opposite terminal. To achieve this, the originating terminal activates the timer 6 for a predetermined time period so that the transmission and reception means 12 using communication control portion 22 may send a predetermined flag pattern during the period. The opposite terminal compares the transmitted flag pattern with a flag pattern stored in itself. If they are identical with each other, the opposite terminal returns an acknowledgment signal to the originating terminal. Upon receiving the acknowledgment signal, the originating terminal judges that the communication speed thereof is equal to that of the opposite terminal, and starts communicating data.

If the data communication speeds of the terminals do not agree with each other, i.e., if data sampling clocks of the terminals are different from each other, the opposite terminal cannot identify the flag pattern transmitted from the originating terminal. Therefore the opposite terminal sends no acknowledgment signal to the originating terminal. The transmission and reception means 12 of the originating terminal, therefore, does not receive the acknowledgment signal within the time set in the timer 6. The receiving condition judging means 14 detects this situation that the time to receive the acknowledgement has elapsed and judges or determines that the communication speeds of the originating and opposite terminals differ from each other. Then, the receiving condition judging means 14 sends a predetermined signal to the speed switching instruction means 16 to activate the speed switching control means 18, thereby switching the communication speed in speed switching circuit 24, for example, from 64 Kbps to 56 Kbps. Thereafter, the communication processing portion 2 or the transmission and reception means 12 of the originating terminal again carries out the setting up controlling the communication process on the D-channel. If this process is successfully completed, the originating terminal again sends the predetermined flag pattern to see whether an acknowledgment signal for it is returned.

According to the invention, the facsimile terminal may have a repeat counter 4 in addition to the timer 6. The repeat counter 4 cooperates with the speed switching instruction means 16 to control the speed switching control means 18 in switching the data communication speed from one to another. When the receiving condition judging means 14 judges that data is not normally or successfully received, the repeat counter 4 helps switch the communication speed from one speed to another in resending the flag pattern to the opposite terminal.

The repeat counter 4 may be used for providing timing to switch the data communication speed from one to another. The repeat counter 4 may also set a time period for transmitting a flag pattern. Repeat counter 40 can then take the place of timer 6, and timer 6 can be eliminated. The repeat counter 4 may be set with a predetermined value A, which is changed whenever the receiving condition judging means 14 judges that a flag pattern is not correctly received. And whenever the value in the repeat counter 4 is changed, the speed switching control means is activated to switch the data communication speed from one to another. The repeat counter 4 may initiate, when activated, the timer 6.

The repeat counter 4 may hold 0 or 1 as an initial value, and when it is judged that data is not received normally, increase the value. Alternatively, the initial value may be 10, which is decreased whenever it is judged that data is not received normally.

The repeat counter 4 may define the number of resending (redialing) operations. The value set in the repeat counter 4 may determine a communication speed of 64 Kbps or 56 Kbps. For example, if the value in the repeat counter 4 is even, the communication speed is 64 Kbps, and if it is odd, the speed is 56 Kbps. Usually, the value in the repeat counter 4 is set to an even number.

The communication speed setting portion 7 includes the receiving condition judging means 14, speed switching instruction means 16, and speed switching control means 18.

After receiving the information that a flag pattern or an acknowledgment signal has been transmitted, the receiving condition judging means 14 checks to see whether or not the transmission and reception means 12 receives a predetermined flag pattern until or before a time-out of the timer 6. Namely, a value set in the timer 6 defines a time period for judging the receiving condition. If the predetermined flag pattern is not received within the time period defined by the timer 6, the receiving condition judging means 14 activates the speed switching control means 18 through the speed switching instruction means 16 to switch the communication speed from one speed to another.

The speed switching control means 18 refers to or examines a value A set in the repeat counter 4. For example, if the value A is even, the speed switching control means 18 sets a communication speed of 64 Kbps, and if it is odd, 56 Kbps. In this way, the repeat counter 4 is used for setting the communication speed. The communication speed is set or switched when the speed switching instruction means 16 provides a speed switching instruction, or when a repeat constant or valve is set or changed in the repeat counter 4.

Although the originating (transmitting) terminal has been explained, the above explanation is applicable for the opposite (receiving) terminal.

Figure 3:
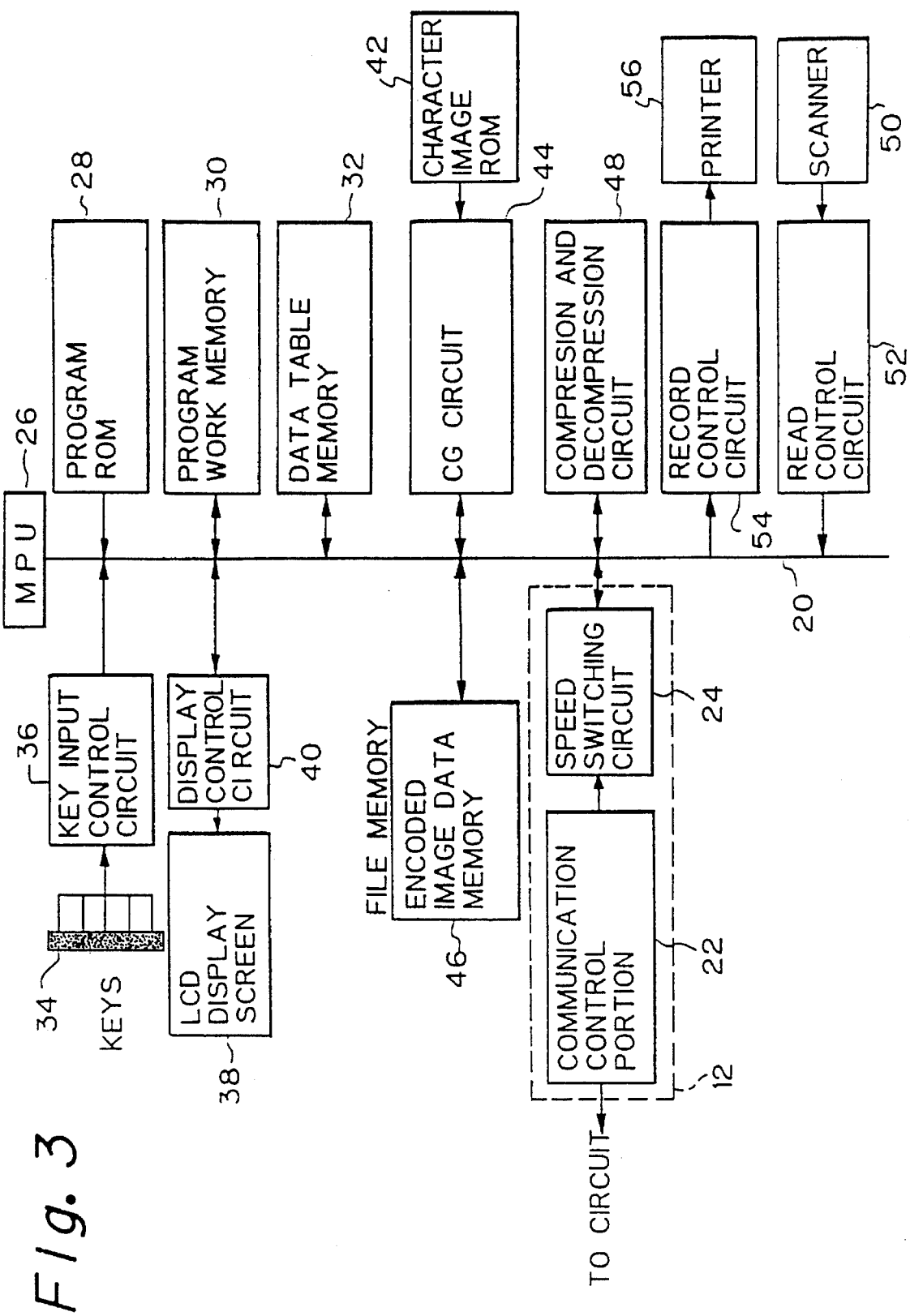
FIG. 3 is a block diagram showing the facsimile terminal equipment.

FIG. 3 is a block diagram showing the details of the facsimile terminal 1A according to the invention.

In the figure, a program ROM (read only memory) 28 and a program work memory 30 which is a RAM (random access memory), store a variety of programs. These programs correspond to the communication processing portion 2, communication speed setting portion 7, receiving condition judging means 14, speed switching instruction means 16, and speed switching control means 18. An MPU (main processing unit) 26 executes these programs. Namely, the MPU 26 and the programs constitute the portions and means 2, 7, 14, 16, and 18. Predetermined regions of the program wash memory 30 serve as the repeat counter 4 and timer 6.

The transmission and reception means 12 has a communication control portion 22 which is connected to the ISDN circuit 10 to transmit or receive data. The transmission and connection means 12 also has a speed switching circuit 24 for switching the data communication speed from one to another.

The receiving condition judging means 14, realized or performed by a program executed by the MPU 26, monitors data received by the communication control portion 22. If the receiving condition judging means 14 confirms that the communication control portion 22 is not normally or successfully receiving data, the MPU 26 controls the speed switching circuit 24. Namely, the speed switching instruction means 16, realized or performed by a program executed by the MPU 26 provides the speed switching control means 18 which is similarly realized by a program, executed by the MPU 26, with a speed switching instruction. The data communication speed is then automatically switched from 64 Kbps to 56 Kbps or vice versa until the communication control portion 22 receives data normally. This speed switching takes place according to the value A in the repeat counter 6 which may change from an even number to an odd number or vice versa.

The data table memory (RAM) 32 of FIG. 3 stores data such as simplified dial numbers and one-touch dial numbers. This data can be selected by entering the necessary data through keys 34 and a key input control circuit 36.

An LCD display screen 38 displays various information under the control of a display control circuit 40. The keys 34 and LCD display screen 38 form a control panel of the facsimile terminal. According to operation guidance sequentially displayed on the control panel, an operator enters the number of an opposite facsimile terminal, a value T for the timer 6, etc. The value T for the timer 6 is stored at a predetermined address of the program work memory 30. A value A for the repeat counter 4 is set in the facsimile terminal in advance or may be set externally.

A character image ROM 42 stores font patterns used for the header of a manuscript to be transmitted or received. The character patterns are converted into line data by a character generator (CG) circuit 44.

Image data to be transmitted or received is stored in a file memory 46, and compressed or decompressed in a compression and decompression circuit 48.

A manuscript to be transmitted is read by a scanner 50, and the read image data is passed through a read control circuit 52, compressed in the compression and decompression circuit 48, and stored in the file memory 46. Thereafter, the image data is transmitted at a predetermined communication speed from the communication control portion 22.

On the other hand, for a manuscript that is to be received, compressed image data is received at a predetermined communication speed by the communication control portion 22, and stored in the file memory 46. The image data is then decompressed in the compression and decompression circuit 48, passed through a record control circuit 54, and printed on a sheet of paper with a printer 56.

Figure 4:
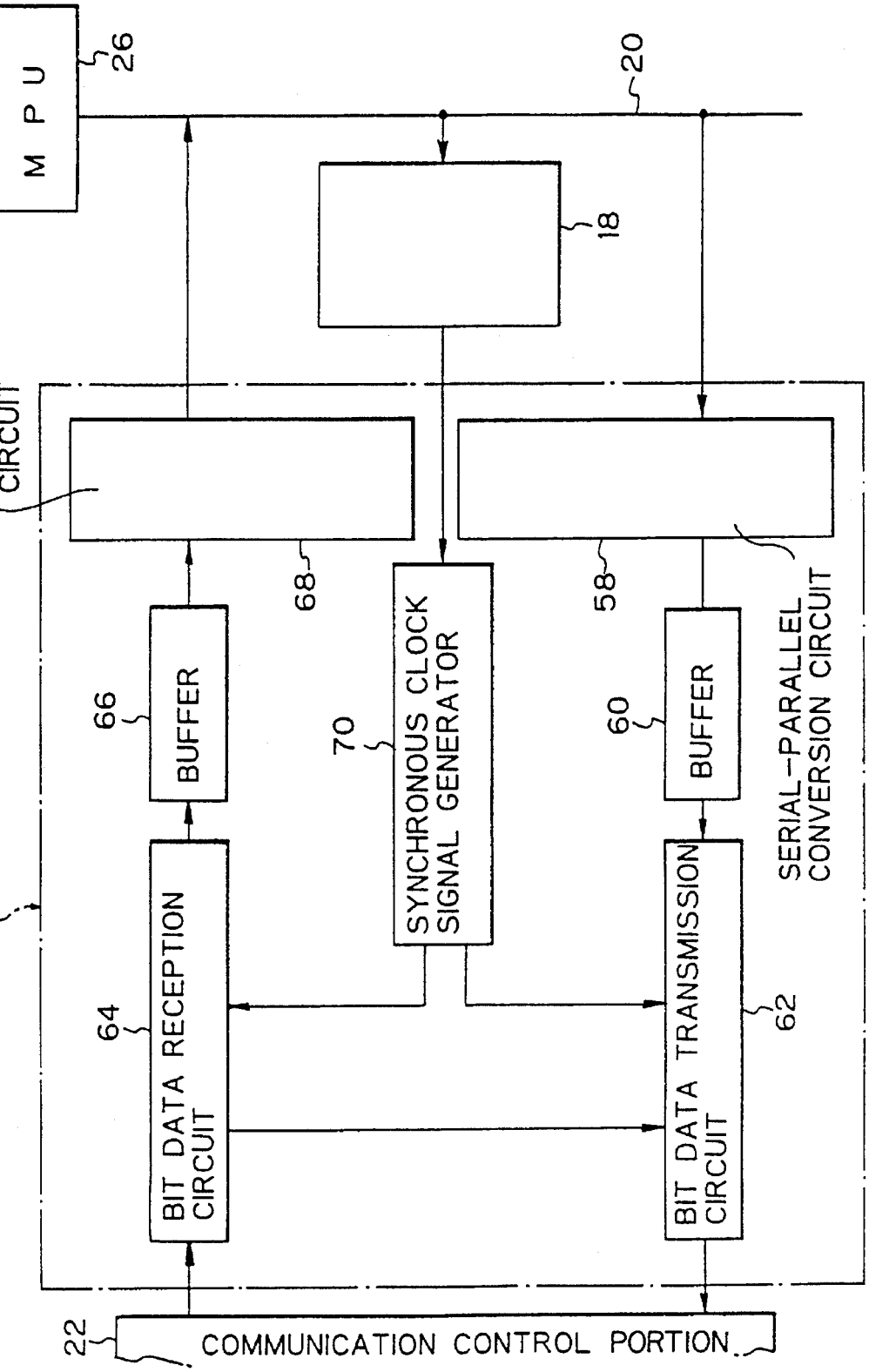
FIG. 4 is a block diagram showing a speed changing circuit of the embodiment.

FIG. 4 shows an example of the speed switching circuit 24 according to the invention.

For facsimile data to be transmitted, the MPU 26 or the communication processing portion 2 takes a predetermined number of bits of facsimile data (encoded image data) to be transmitted out of the file memory 46, and transfers them to a serial-parallel conversion circuit 58 through a bus (data bus) 20. The serial-parallel conversion circuit 58 converts the facsimile data which is parallel data into serial data. The serial data is transferred to a bit data transmission circuit 62 through a buffer 60, and then to the communication control portion 22.

On the other hand, for facsimile data to be received, facsimile data (serial data) is received by the communication control portion 22, passed through a bit data reception circuit 64 and a buffer 66, and received by a serial-parallel conversion circuit 68, which converts the serial data into parallel data and sends it to the data bus 20.

A synchronous clock signal generator 70 provides the bit data transmission circuit 62 and bit data reception circuit 64 with a synchronous clock signal. The frequency of the clock signal determines the data communication speed. To change the communication speed from one speed to another, the synchronous clock signal generator 70 comprises two clock generators for generating synchronous clock signals of 64 Kbps and 56 Kbps, respectively. The synchronous clock signal generator 70 receives a communication speed switching signal from the speed switching control means 18 through the bus (data bus) 20. According to the switching signal, the synchronous clock signal generator 70 provides the bit data transmission circuit 62 and bit data reception circuit 64 with one of the two synchronous clock signals.

According to the synchronous clock signal, the bit data transmission circuit 62 transmits each bit of serial data. This determines a transmission speed. The bit data reception circuit 64 sequentially latches data from the communication control portion 22 in synchronism with the synchronous clock signal, thereby receiving serial data at a predetermined data receiving speed.

When the facsimile terminal 1A is to receive image data, the bit data reception circuit 64 receives a flag pattern and transfers it to the bit data transmission circuit 62, which returns the same as an acknowledgment flag to an originating facsimile terminal.

The invention may employ a communication speed switching means which employs a single clock signal. In this case, each data frame comprises a predetermined number of valid and invalid bits, and the communication speed switching means picks up only the valid bits and abandons the invalid bits. By changing a proportion of the valid and invalid bits in each frame, data communication speed on the reception side can be changed even with the data communication program running at a constant speed.

For example, each data frame may comprise eight bits, in which seven are valid bits containing significant data and the remaining one is an invalid bit containing insignificant optional data. Supposing the data frames are transmitted at a speed of 64 Kbps, a receiver facsimile terminal abandons the invalid bit in each frame, and tentatively stores the seven valid bits in the buffer 66. When the buffer 66 receives one of the valid bits of the next frame, the buffer 66 transfers the data of eight bits to the serial-parallel conversion circuit 68. As a result, the communication speed of 64 Kbps is reduced to seven-eighths, i.e., 56 Kbps.

A specific example of this communication system will be illustrated in FIGS. 12 to 17.

Now, one frame of bit data comprises 8 bits (A1 to A8, B1 to B8, C1 to C8 or the like) and each of the bits are serially coming into or received in a receiving line (X) frame by frame with a speed of 64 Kbps as shown in FIG. 13.

On the other hand, when the receiving unit receives the transmitted bit data at a speed of 64 Kbps, each bits is read in synchronization with each one of a clock pulse having a speed of 64 Kbps as shown in line (Y) of FIG. 13.

Accordingly, each bit of data is stored or received in a buffer as shown in FIG. 12.

On the other hand, when the receiving unit receives the transmitted bit data at a speed of 56 Kbps, each one of the bits is read in synchronization with each one of clock pulse having a speed of 64 Kbps except that every eighth pulse in the 64 Kbps pulses is omitted. Thus bit data which comes into the receiving line at every time when the omitted pulse is generated (A8, B8, C8 and D8), is cancelled as shown in line (Z) of FIG. 13.

Therefore, buffer data to which the transferred data is stored or received is shown in FIG. 14.

On the other hand, buffer data which should be transmitted is shown in FIG. 15.

When the bit data are transmitted at a speed of 64 Kbps, each of the bits is arranged serially with respect to each other in a transmitting line as shown in line (X) of FIG. 16.

In FIG. 16, line (Y) denotes a pulse train in a transmitting line which transmits the bit data at the speed of 64 Kbps, while line (Z) denotes a pulse train in a transmitting line which transmits the bit data at the speed of 56 Kbps.

When the bit data are transmitted at a speed of 56 Kbps, each of the bits is arranged serially with respect to each other in a transmitting line as shown in line (X) of FIG. 17 with a dummy bit DM as an invalid bit interposed between every seventh and eighth bit of serially arranged bits.

In FIG. 17, line (Y) denotes a pulse train in a transmitting line which transmits the bit data at the speed of 64 Kbps, while line (Z) denotes a pulse train in a transmitting line which transmits the bit data at the speed of 56 Kbps.

In both transmitting lines of (y) and (z), the invalid bit, i.e., a dummy bit DM is ignored.

Figure 5:
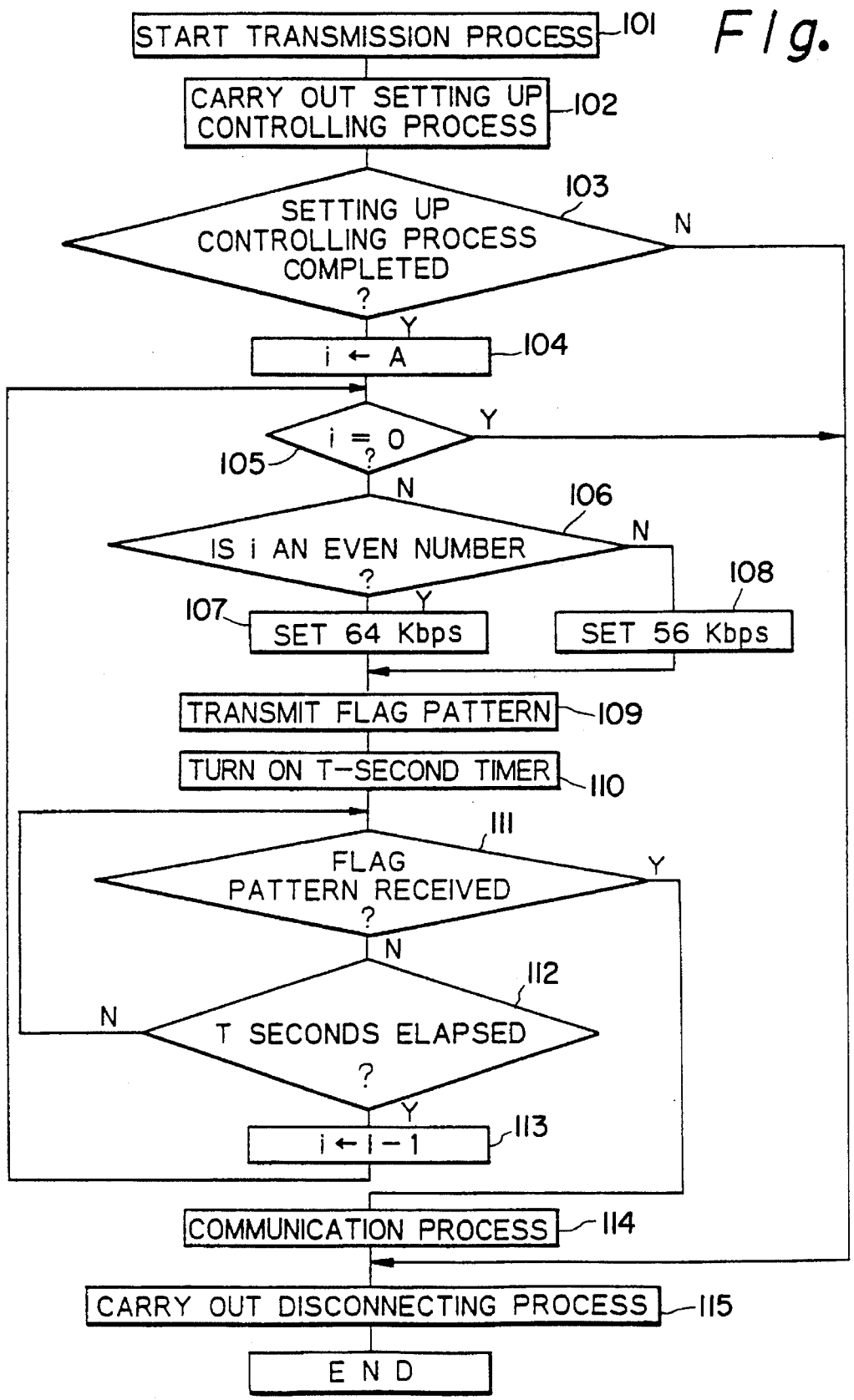
FIG. 5 is a flowchart showing a transmission process according to the embodiment.

FIG. 5 is a flowchart showing a transmission process of the invention. The following numbers represent steps of this process.

(1) The communication processing portion 2 starts 101 transmission and performs 102 setting up controlling process including the transmission of a setting up signal to an opposite facsimile terminal (or to the network 8), and checks 103 to see whether or not the process is completed normally or successfully. The setting up controlling process is done on the D-channel.

(2) If the setting up controlling process is normally completed, the communication processing portion 2 connects the B-channel, and sets 104 a predetermined value A (for example an even number) in the repeat counter 4.

(3) The communication processing portion 2 checks 105 to see whether or not a present value "i" of the repeat counter 4 is "0".

(4) If it is not 0, the speed switching control means 18 checks 106 to see if the value i of the repeat counter 4 is an even number.

(5) If it is the even number, the speed switching control means 18 sends a predetermined switching signal to the synchronous clock signal generator 70 of the transmission and reception means 12 to provide a synchronous clock signal of 64 Kbps, thereby setting 107 a data communication speed of 64 Kbps.

(6) If the value i is an odd number, a data communication speed of 56 Kbps is set 108 in a manner similar to Step (5).

The synchronous clock signal is supplied to both the bit data reception circuit 64 and bit data transmission circuit 62, thereby establishing the same transmission and reception speeds. It is also possible to supply a synchronous clock signal of 56 Kbps for even numbers in the repeat counter 4. When the facsimile terminal 1A frequently communicates data at the speed of 64 Kbps, the value A to be initially set in the repeat counter 4 will be an even number to supply the synchronous clock signal of 64 Kbps. In the opposite case, an odd number will initially be set in the repeat counter 4 to supply the synchronous clock signal of 56 Kbps. Namely, the order of the communication speeds is so determined to establish communication as quickly as possible based on the most frequently used communication speed of the facsimile terminal.

(7) The transmission and reception means 12 transmits 109 a flag pattern which is a predetermined bit pattern on the B-channel to the opposite facsimile terminal at the communication speed determined in Step (5) or (6), and sets 110 a predetermined value T in the timer 6 to start the timer. Thereafter, the transmission and reception means 12 informs the receiving condition judging means 14 of the transmission of the flag pattern, thereby asking the receiving condition judging means 14 to monitor communication.

(8) The receiving condition judging means 14 monitors whether the transmission and reception means 12 receives an acknowledgment flag 111 until the time-out 112 of the timer 6.

(9) If the acknowledgment flag is not received before the time-out of the timer 6, the receiving condition judging means 14 informs the speed switching instruction means 16 and communication processing portion 2 of the fact.

The communication processing portion 2 decreases 113 the value i of the repeat counter 4 by one, and the process returns to 105 in FIG. 5.

The speed switching instruction means 16 provides the speed switching control means 18 with a speed switching instruction. In response to this instruction, the speed switching control means 18 executes Step (4), 106 in FIG. 5, and the following steps.

When Step (9) decreases 113 the value i before proceeding to Step (3), the value i changes from the even (or odd) number to an odd (or even) number. Namely, the communication speed of 64 Kbps (or 56 Kbps) is automatically changed to 56 Kbps (or 64 Kbps). If the reason why the acknowledgment flag has not been received is due to the difference of communication speed, the change in the communication speed enables the acknowledgment flag to be received 111 in Step (8). Once the acknowledgment flag is successfully received, communication 114 will be established in Step (10).

An interval of switching the communication speed from one to another depends on the value T set in the timer 6. The value T can be set externally by an operator and is usually short, for example, three seconds. Unlike the prior art which repeatedly transmits a flag pattern on the B-channel for 20 to 60 seconds for which a fee is charged even if no actual communication is carried out, the invention shortens useless connection time on the B-channel, thereby reducing unnecessary payment and effectively using the ISDN circuit 10. In addition, the probability of succeeding or establishing the communication is very high according to the invention.

(10) If the acknowledgment flag is received 111 before the time-out 112 of the timer 6 in Step (8), the communication processing portion 2 transmits image data at the set communication speed. Namely, image data is read out of the file memory 46, converted into serial data in the serial-parallel conversion circuit 58, and transmitted from the bit data transmission circuit 62 in synchronism with the predetermined synchronous clock signal.

(11) If the setting up controlling process is not normally completed 103 in Step (1), or if the value i is 0 in Step (3), 105 or if the communication process is completed in Step (10) 114, the communication processing portion 2 carries out a disconnection process 115.

When the value i is decreased to 0, it means that normal communication has not been started or established although the communication speeds of 64 Kbps and 56 Kbps have been repeatedly switched from one to another. The cause of this may be a failure in the opposite facsimile terminal or in the ISDN circuit 10.

Figure 6:
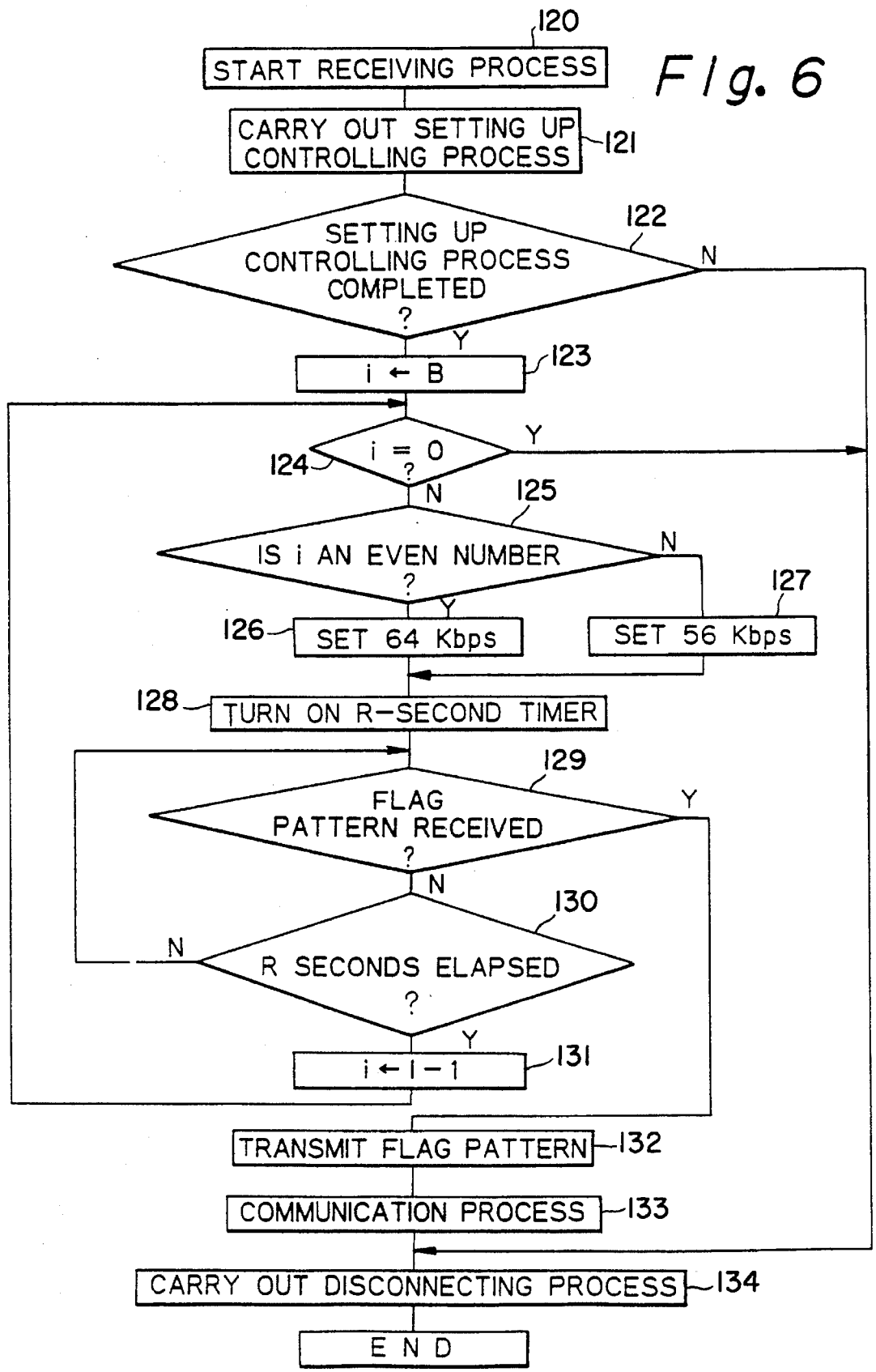
FIG. 6 is a flowchart showing a process of acknowledging a call according to the embodiment.

FIG. 6 is a flowchart showing an acknowledging process to be carried out in the facsimile terminal 1A of the invention when it serves as a receiver terminal. The following numbers represent steps in the receiving process.

(12) The communication processing portion 2 carries out a setting up controlling process 121 including a process of receiving 120 setting up data from an originating or transmitting facsimile terminal (or the network 8), and checks to see whether or not the process is completed normally 102.

(13) If the setting up controlling process is completed normally, the communication processing portion 2 connects the B-channel, and sets or loads a predetermined value B 123 (for example, an even number) in the repeat counter 4. The value B may be equal to the value A.

(14) Same step 124 as Step (3) of FIG. 5.

(15) Same step 125 as Step (4).

(16) Same step 126 as Step (5).

(17) Same step 127 as Step (6).

(18) The transmission and reception means 12 or the communication processing portion 2 sets 128 a predetermined value R in the timer 6 to start it, and then asks the receiving condition judging means 14 to monitor the receiving condition. The value R for the receiving process is usually half the value T, i.e., 1.5 seconds. Similar to the value T, the value R may be set externally began operator.

(19) The receiving condition judging means 14 repeatedly checks to see whether or not the transmission and reception means 12 has received 129 a flag pattern until the time-out 130 of the timer 6.

(20) If the flag pattern is not received before the time-out 130 of the timer 6, the receiving condition judging means 14 informs the speed switching instruction means 16 and communication processing portion 2 of the fact.

The communication processing portion 2 decreases 131 the value i of the repeat counter 4 by one, and the process proceeds to Step (14) 124.

The speed switching instruction means 16 provides the speed switching control means 18 with a speed switching instruction. In response to this instruction, the speed switching control means 18 executes Step (15) 125 and the following steps.

Namely, the communication speed of 64 Kbps (or 56 Kbps) is automatically changed to 56 Kbps (or 64 Kbps). If the reason why the flag pattern has not been received is due to the difference in communication speed, the change in the communication speed enables the flag pattern to be received in Step (19). If the flag pattern is successfully received 129, communication will be started in Step (21) 132.

An interval of switching the communication speed from one to another depends on the value R set in the timer 6. The value R can be set externally and is usually short, for example, 1.5 seconds. The invention, therefore, shortens useless connection time on the B-channel, thereby saving a fee for the connection and effectively using the ISDN circuit 10. In addition, the probability of successfully establishing communication is very high according to the invention.

It is preferable to slightly differ the values set in the repeat counter 4 and timer 6 of the originating facsimile terminal from those of the opposite facsimile terminal. If the values are the same on both the terminals, the originating and opposite terminals may simultaneously switch their communication speeds from one to another, and no actual communication may be started at a matching speed since the facsimile terminal will never be operating at the same speed simultaneously.

(21) If the flag pattern is received 129 before the time-out 130 of the timer 6 in Step (19), the transmission and reception means 12 returns an acknowledgment flag to the opposite originating facsimile terminal. Namely, the flag pattern received by the bit data reception circuit 64 is transferred to the bit data transmission circuit 62, which returns the same as the acknowledgment flag.

(22) The communication processing portion 2 receives 133 image data at the set or loaded communication speed. The bit data reception circuit 64 fetches serial data in synchronism with the predetermined synchronous clock signal. The serial data is converted into parallel data in the serial-parallel conversion circuit 68, and stored in the file memory 46.

(23) Same step 134 as Step (11) of FIG. 5.

Figure 7:
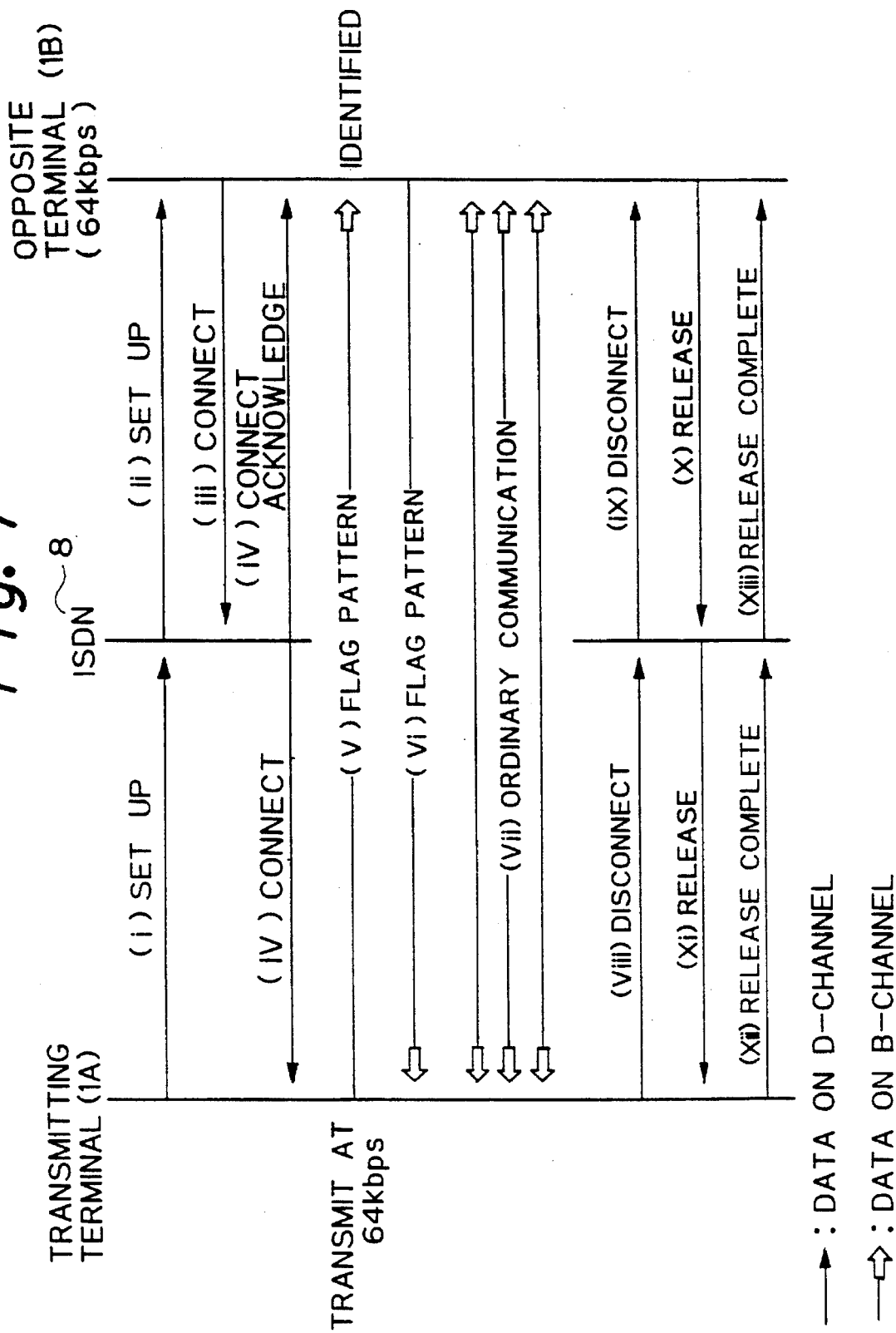
FIGS. 7 to 10 are diagrams showing communication sequences according to the embodiment.
Figure 8:
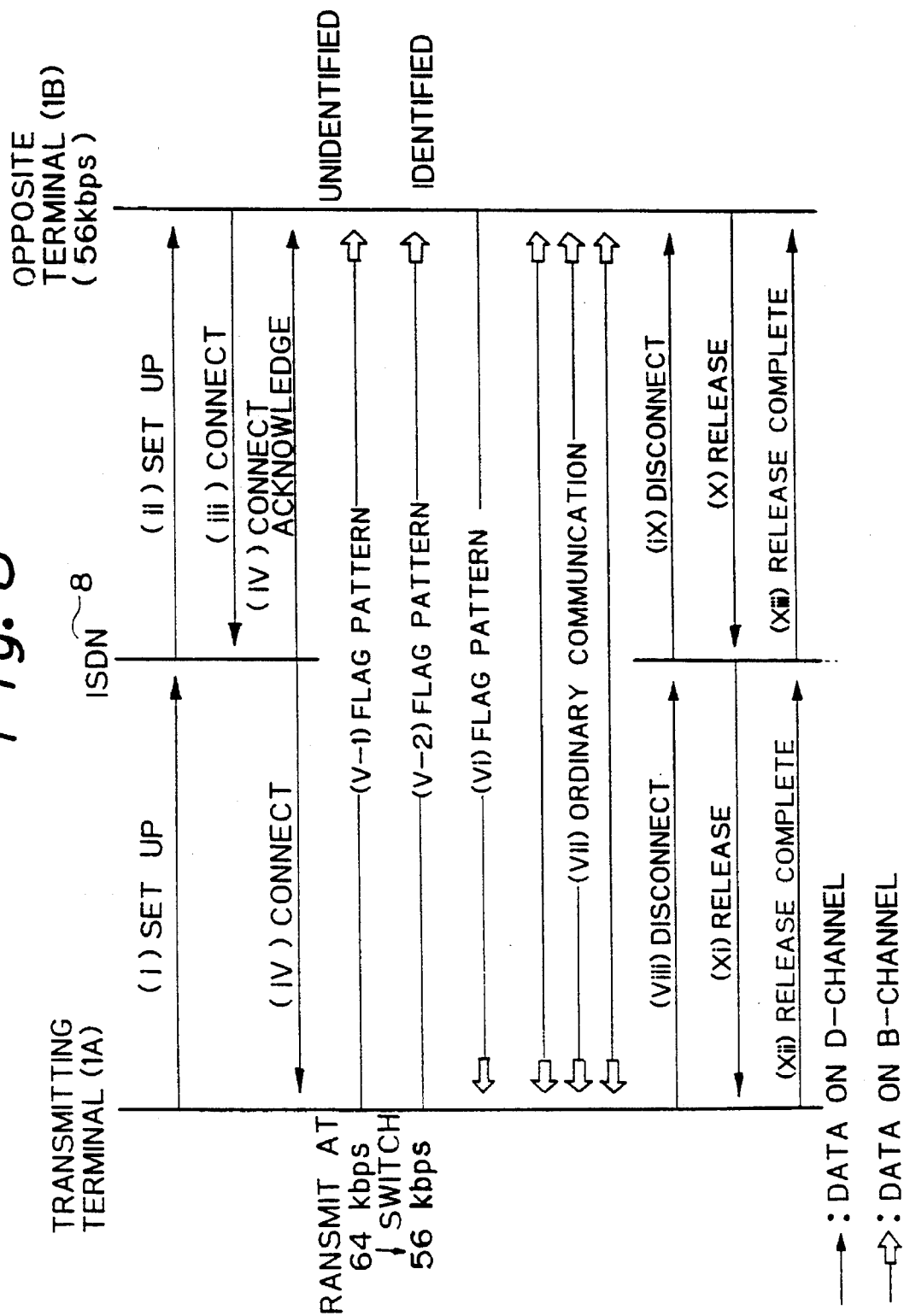

FIGS. 7 to 11 show communication sequences. In FIGS. 7 and 8, the facsimile terminal 1A of the invention serves as an originating terminal, and in FIGS. 9 and 10, it serves as a receiving terminal. As explained before, the communication speed of the facsimile terminal 1A is set to be 64 Kbps at first.

In FIG. 7, the terminal 1A calls an opposite terminal 1B whose communication speed is 64 Kbps. Firstly, the terminal 1A sends a set-up signal to the network 8 such as the ISDN (Step i). The network 8 transfers the set-up signal to the opposite terminal 1B (Step ii). In response to the set-up signal, the opposite terminal 1B sends a connect signal to the network 8 (Step iii). The network transfers the connect signal to the terminal 1A, and sends a connect acknowledgment signal to the opposite terminal 1B (Step iv), thereby normally completing the setting up controlling process of the above-mentioned Step (1) on the D-channel.

The terminal 1A connects the B-channel and transmits a predetermined flag pattern on the B-channel at the communication speed of 64 Kbps to the opposite terminal 1B (Step v). The opposite terminal 1B identifies the flag pattern and returns the same to the terminal 1A (Step vi), thereby starting facsimile data transmission (Step vii).

After completing the facsimile data transmission, the terminal 1A disconnects the B-channel and transmits a disconnection signal to the network 8 (Step viii). The network 8 transfers the disconnection signal to the opposite terminal 1B (Step ix). In response to the disconnection signal, the opposite terminal 1B sends a release signal to the network 8 (Step x). The network 8 transfers the release signal to the terminal 1A (Step xi). Upon receiving the release signal, the terminal 1A sends a release completion signal to the network 8 (Step xii). The network 8 transfers the release completion signal to the opposite terminal 1B (Step xiii), thereby completing the disconnection process of Step (11) on the D-channel.

This example in FIG. 7 corresponds to, for example, communicating data in Japan where both facsimile terminals operate at the communication speed of 64 Kbps.

FIG. 8 shows a data transmission process between the terminal 1A whose communication said in 64 kbps and the opposite terminal 1B whose communication speed is 56 Kbps.

A first flag pattern transmitted from the terminal 1A is not identified in the opposite terminal 1B so that the opposite terminal 1B does not return an acknowledgment flag (Step v-1). The invention, therefore, switches the communication speed of the terminal 1A from 64 Kbps to 56 Kbps. As a result, the next flag pattern from the terminal 1A is identified in the opposite terminal 1B (Step v-2), and the opposite terminal 1B returns an acknowledgment flag to the terminal 1A (Step vi). The terminal 1A confirms the acknowledgment flag, and starts to transmit facsimile data to the opposite terminal 1B (Step vii).

This example corresponds to, for example, transmitting data from Japan to North America.

Figure 9:
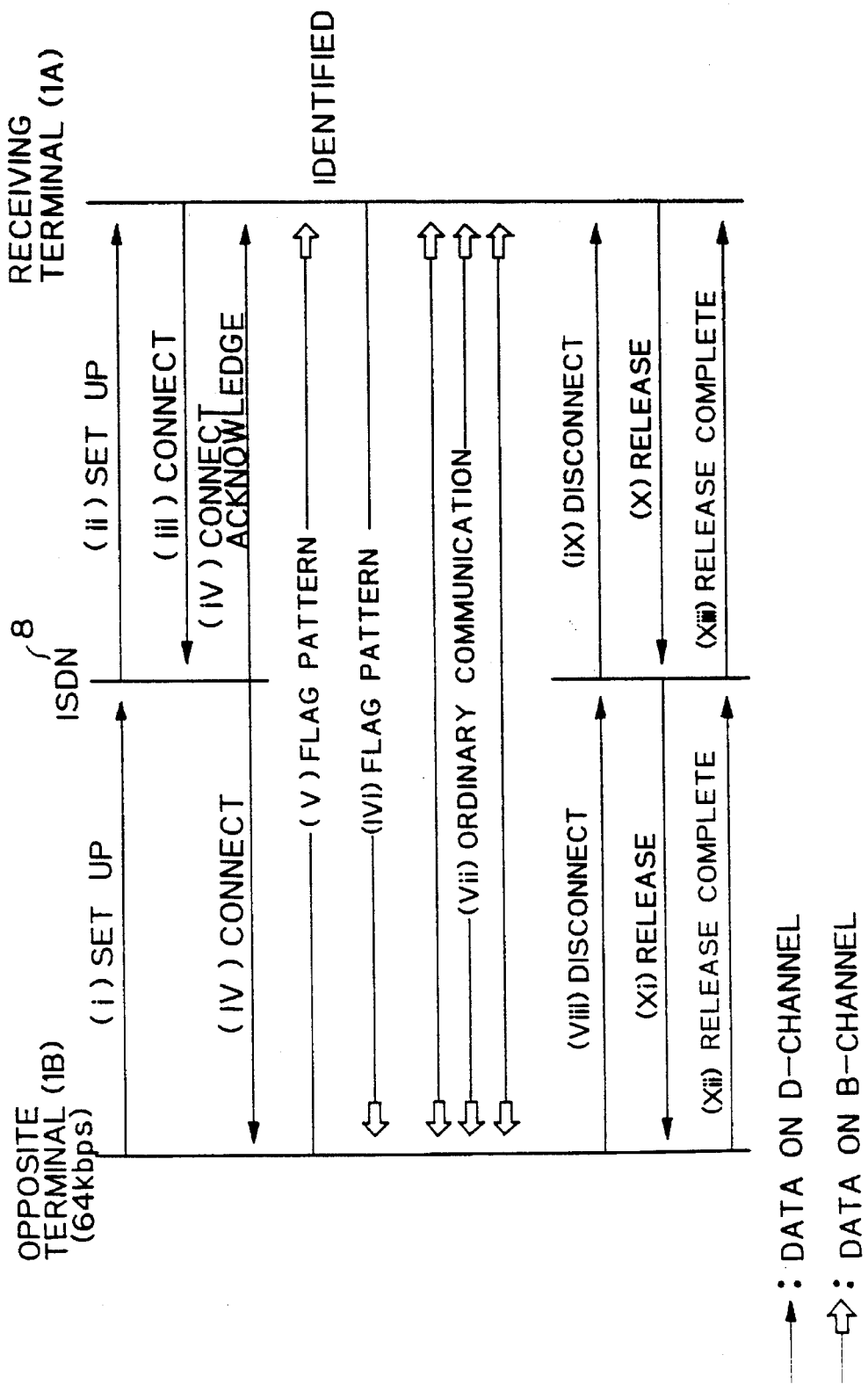

FIG. 9 shows a process for terminal 1A operating at a communication speed of 64 Kbps to receive data from the opposite terminal 1B which operates at a communication speed of 64 Kbps.

A first flag pattern from the opposite terminal 1B is identified in the terminal 1A (Step v), and the terminal 1A returns an acknowledgment flag to the opposite terminal 1B (Step vi). After confirming the acknowledgment flag, the opposite terminal 1B starts to transmit facsimile data to the terminal 1A (Step vii).

This example in FIG. 9 corresponds to, for example, data communication in Japan.

Figure 10:
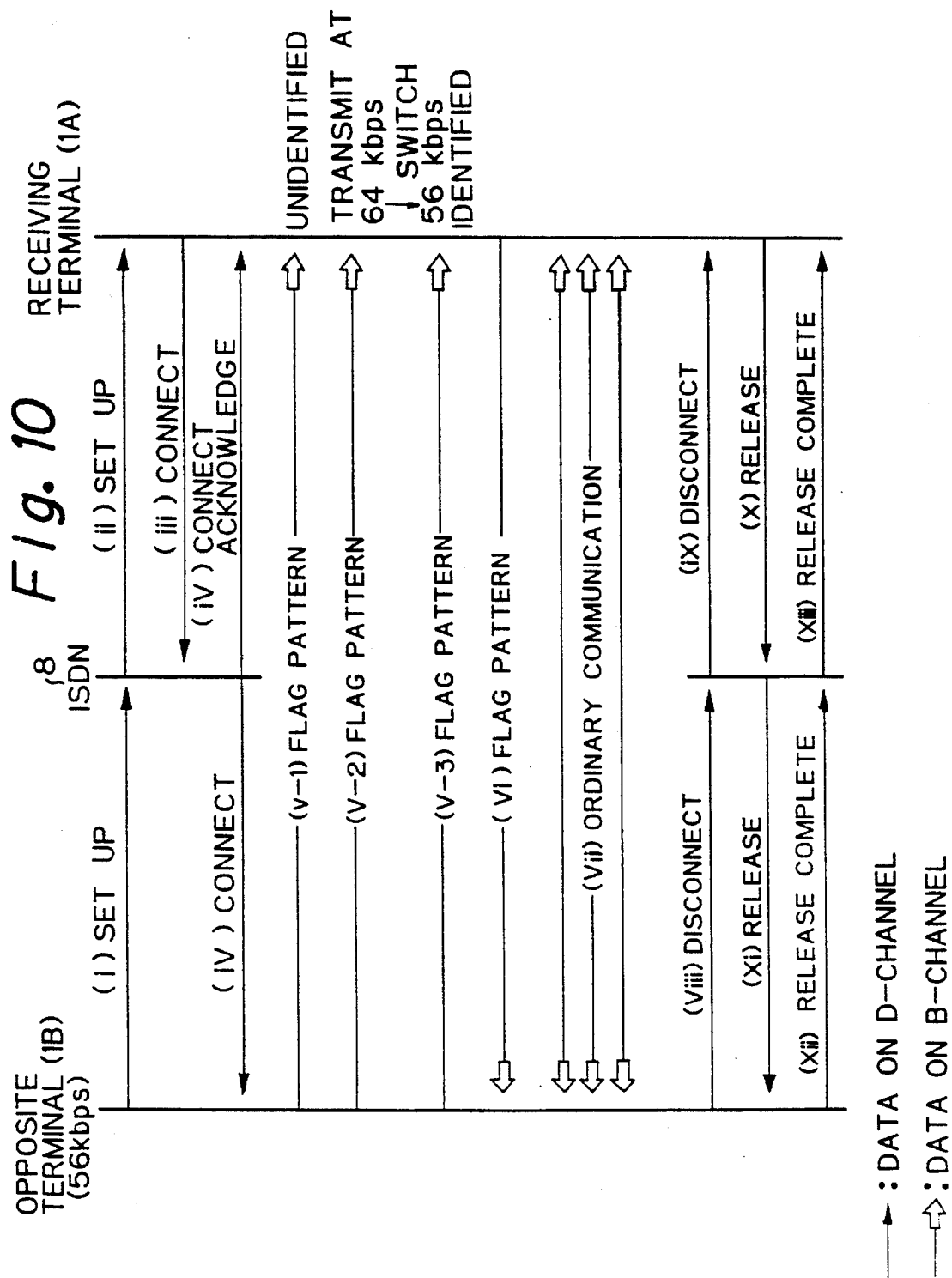
Figure 11:
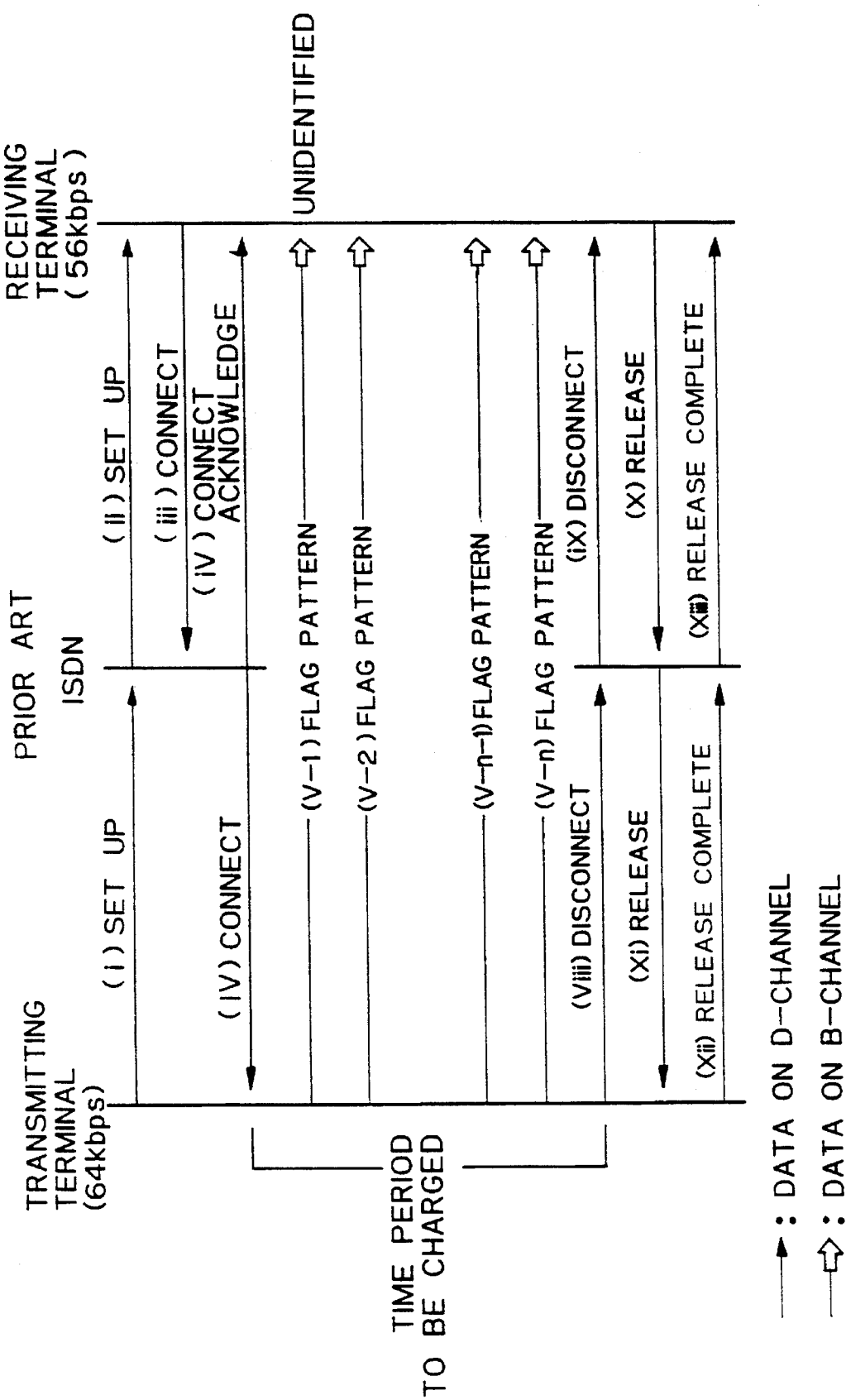
FIG. 11 is a diagram explaining a prior art.

FIG. 10 shows a process for terminal 1A operating at a communication speed of 64 Kbps to receive data from the opposite terminal 1B which operates at a communication speed of 56 Kbps.

The terminal 1A cannot identify first and second flag patterns transmitted from the terminal 1B (Steps v-1 and v-2). Namely, the terminal 1A judges or determines that data from the opposite terminal is unacceptable, and does not return an acknowledgment flag to the opposite terminal 1B. The invention, therefore, switches the communication speed of the terminal 1A from 64 Kbps to 56 Kbps. As a result, the next flag pattern from the opposite terminal 1B is identified in the terminal 1A (Step v-3), and the terminal 1A returns an acknowledgment flag to the opposite terminal 1B (Step vi). After confirming the acknowledgment flag, the opposite terminal 1B starts to transmit facsimile data to the terminal 1A (Step vii).

This example in FIG. 10 corresponds to, for example, transmitting data from North America to Japan.

In this way, the terminal 1A according to the invention automatically switches its communication speed from one speed to another if it cannot normally receive data from the opposite terminal 1B, thereby aligning or adjusting the communication speed between the terminals 1A and 1B on the B-channel to the identified.

Even if the communication speed of the terminal 1A differs from that of the opposite terminal 1B, facsimile communication between the terminals can surely be started nearly at once or sporting (in several seconds), thereby effectively using a network circuit and reducing a fee for the circuit correction time.

By switching the communication speed from 64 Kbps to 56 Kbps and oppositely, the data communication speed of the terminal 1A surely matches that of the opposite terminal 1B.

Since the values T for the transmitting terminal and R for the receiving terminal to be set in the timer 6 are set to differ from each other, it is possible to quickly establish an identical communication speed between two terminals 1A and 1B.

If a flag pattern is not acknowledged after repeatedly switching the communication speed from one to another until the repeat counter reaches a predetermined value in the flowcharts of FIGS. 8 to 10, it is judged or determined to be a failure in the circuit, and Step viii and the following steps are carried out.

As described above, the receiving condition judging means 14 of the invention judges that data is not received normally if the transmission and reception means 12 does not receive a predetermined signal within a predetermined period of time. For example, an originating terminal transmits a flag pattern at first, and if no acknowledgment flag is received (identified) by the originating terminal within a fixed period of time, the originating terminal judges or determines that it is abnormal or unsuccessive. On the other hand, a receiving terminal sends an acknowledgment signal at first, and if no flag pattern is received (identified) by the receiving terminal within a predetermined period of time, the receiving terminal judges that it is abnormal.

If data is not received normally or successfully, the speed switching control means 18 automatically switches data communication speed from one to another, for example, from 64 Kbps to 56 Kbps. As a result, the data communication speed of the originating terminal on the B-channel can be adjusted to that of the opposite terminal to start facsimile communication.

According to the invention, an operator may pay no attention to the communication speed of an opposite terminal. The invention reduces useless communication and effectively uses the communication circuits or lines.

When no data is received from the opposite terminal, data communication speed is automatically switched from one to another, thereby adjusting the speed of the originating terminal to that of the opposite terminal on the B-channel. Even if the opposite terminal has a different communication speed, facsimile communication can surely be started with respect to the opposite terminal. The invention, therefore, can reduce useless communication on a circuit and save payment for using the circuit.

I claim:

1. In a system for communicating data between first and second facsimile terminal equipment units through a communication circuit such as an ISDN circuit, the first facsimile terminal equipment unit comprising:

a communication processing portion having transmission and reception means for transmitting and receiving data at a communication speed between the first and second facsimile terminal equipment units and for transmitting and receiving at least one of a plurality of predetermined flag patterns each of which represents a respective data communication speed to be used;

receiving condition judging means for determining whether the transmission and reception means receives the data successfully by determining whether the flag pattern received by the first facsimile terminal equipment unit is the same flag pattern which was sent to the second facsimile terminal equipment unit, or by determining whether the flag pattern received by the first facsimile terminal equipment unit can be read;

speed switching instruction means for providing a communication speed switching instruction when the transmission and reception means does not recognize the flag pattern; and speed switching control means for switching the communication speed of the transmission and reception means responsive to the communication speed switching instruction provided by said speed switching instruction means.

2. The facsimile terminal equipment as set forth in claim 1, using a B-channel to communicate data between the first and second facsimile terminal equipment units.

3. The first facsimile terminal equipment unit as set forth in claim 1, further comprising a timer connected to said receiving condition judging means to transfer to a time-out state after a predetermined time period has elapsed, the receiving condition judging means for determining based on the time-out state of the timer that the transmission and reception means does not receive the data.

4. The first facsimile terminal equipment unit as set forth in claim 3, wherein the timer is disposed in the communication processing portion.

5. The first facsimile terminal equipment unit as set forth in claim 3, wherein the predetermined time period can be set in the timer by means for setting the timer external to the first facsimile terminal equipment unit.

6. The first facsimile terminal equipment unit as set forth in claim 3, wherein the predetermined time period during which the timer operates defines a time period within which the transmission and reception means must at least one of continuously transmits a predetermined first signal, and receives a predetermined second signal.

7. The first facsimile terminal equipment unit set forth in claim 3, wherein the predetermined time period may be changed to a new predetermined time period after the predetermined time period has elapsed.

8. The first facsimile terminal equipment unit as set forth in claim 3, further comprising a repeat counter connected to the speed switching control means, the repeat counter being set to a predetermined value and cooperating with the speed switching instruction means to instruct the speed switching control means to switch the communication speed when the receiving condition judging means determines that the data is not received.

9. The first facsimile terminal equipment unit as set forth in claim 8, wherein the predetermined value set in the repeat counter is changed when it is determined that the data is not received resulting in a changed predetermined value, the changed predetermined value set in the repeat counter activating the speed switching control means to switch the communication speed.

10. The first facsimile terminal equipment unit as set forth in claim 8, wherein the timer is initiated when the repeat counter operates.

11. The first facsimile terminal equipment unit as set forth in claim 8, wherein the predetermined value defines a period of time during which the transmission and reception means at least one of continuously transmits a predetermined first signal, and receives a predetermined second signal.

12. The first facsimile terminal equipment unit as set forth in claim 8, wherein the communication speed is switched based on the predetermined value set in the repeat counter.

13. Facsimile terminal equipment as set forth in claim 8, wherein the speed switching control means switches the communication speed between a first communication speed of 56 Kbps and a second communication speed of 64 Kbps.

14. The first facsimile terminal equipment unit as set forth in claim 8, wherein the predetermined value may be changed to a new predetermined value after the predetermined value has terminated.

* * * * *

UNITED STATES PATENT AND TRADEMARK OFFICE
CERTIFICATE OF CORRECTION

PATENT NO. : 5,477,340

DATED : DECEMBER 19, 1995

INVENTOR(S) : Kenichi HASEGAWA

It is certified that error appears in the above-indentified patent and that said Letters Patent is hereby corrected as shown below:

Title page, under "OTHER PUBLICATIONS", line 9, "1982," should be --1982, & JP-A- 57 025 753 (Nippon Telegraph & Telephone Corp. <NTT>), 10 February 1982--.

Col. 1, line 38, "speed be" should be --speed must be--.

Col. 2, line 8, "received" should be --receiving--;
line 9, "then initially" should be deleted;
line 65, "or not" should be deleted.

Col. 3, line 46, "terminals" should be --terminal--.

Col. 4, line 25, "speed" should be --speed.--;
line 67, "controlling" should be deleted.

Col. 5, line 18, "40" should be --4--.

Col. 6, line 11, "wash" should be --work--.

UNITED STATES PATENT AND TRADEMARK OFFICE
CERTIFICATE OF CORRECTION

PATENT NO. : 5,477,340
DATED : DECEMBER 19, 1995
INVENTOR(S) : Kenichi HASEGAWA

It is certified that error appears in the above-indentified patent and that said Letters Patent is hereby corrected as shown below:

Col. 8, line 13, "pulse" should be --pulses--.

Col. 10, line 28, "102." should be --122.--;
line 44, "began" should be --by an--.

Col. 12, line 8, "said in 64 kbps" should be --speed is 64 Kbps--;
line 65, "sporting" should be --shortly--.

Signed and Sealed this

Eleventh Day of June, 1996

BRUCE LEHMAN

Attest:

Attesting Officer

Commissioner of Patents and Trademarks